Jan. 17, 1928.
C. S. BROWN
1,656,659
UNIVERSAL JOINT CONSTRUCTION
Filed July 1, 1924
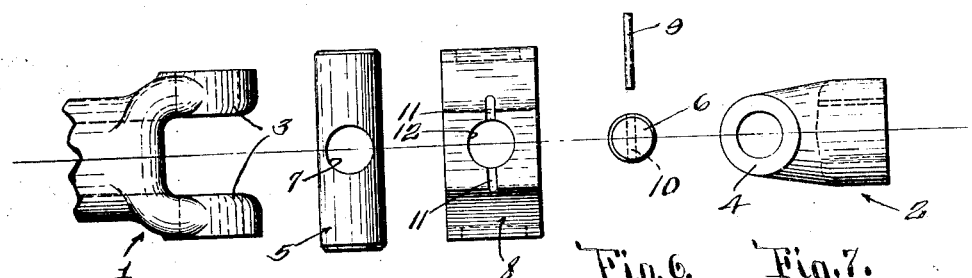
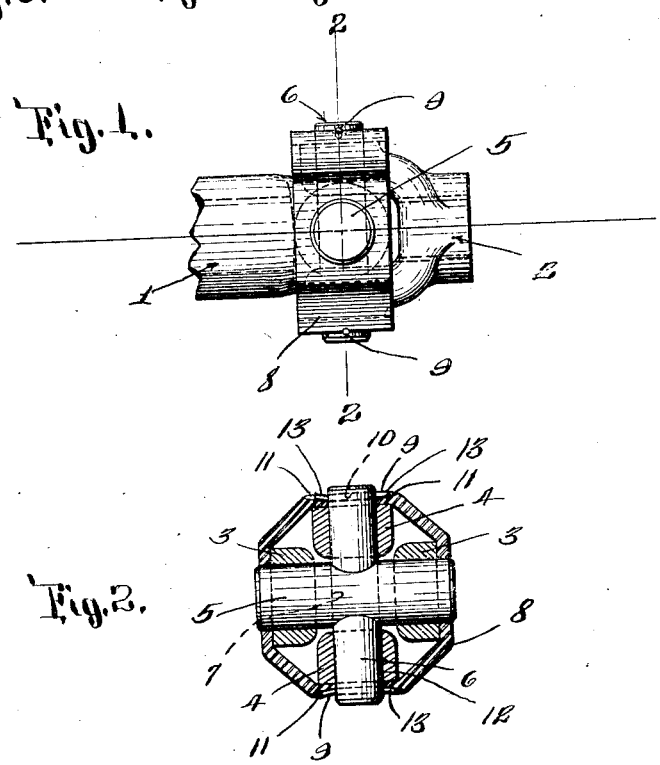
Charles S. Brown — INVENTOR.
BY
Parsons & Bodell — ATTORNEYS.

Patented Jan. 17, 1928.

1,656,659

UNITED STATES PATENT OFFICE.

CHARLES S. BROWN, OF SYRACUSE, NEW YORK.

UNIVERSAL-JOINT CONSTRUCTION.

Application filed July 1, 1924. Serial No. 723,569.

This invention has for its object a universal joint which is particularly simple in construction, economical in manufacture and composed of a few simple parts and is highly efficient and durable in use.

The invention consists in the novel features and in the combinations and constructions hereinafter set forth and claimed.

In describing this invention, reference is had to the accompanying drawing in which like characters designate the corresponding parts in all the views.

Figure 1 is an elevation of this universal joint.

Figure 2 is a sectional view of line 2—2, Figure 1.

Figure 3 is an elevation of one of the yoke arms.

Figure 4 is an elevation of the larger shaft of the cross member which shaft is journalled in the yoke arm shown in Figure 3.

Figure 5 is an elevation of the tubular body.

Figure 6 is an end elevation of the smaller shaft and the key for locking it to the body.

Figure 7 is an elevation of the yoke in which the smaller shaft is journalled, the parts being shown in Figures 3 to 7 in position to assemble.

This universal joint comprises, generally, a pair of yokes arranged at a right angle to each other, a cross member having arms journalled respectively in the yokes, a tubular body enclosing the yokes and having portions overlying the outer faces of the yokes, such portions being formed with openings for receiving the ends of the arms of the cross member, and means for locking the cross member to the body.

1 and 2 designate respectively the yokes arranged at a right angle to each other in the usual manner, the yoke 1 being formed with bearings 3 at the ends of the arms thereof and the yoke 2 having similar bearings 4 at the ends of the arms thereof.

The cross member consists of two shafts 5 and 6, the shaft 5 being of larger diameter than the shaft 6 and being journalled in the bearings 3 of the yoke 1 and the shaft 6 extending through a transverse passage 7 in the shaft 5 between the ends thereof, this shaft 6 being journalled in the bearings of the yoke 2.

As the shaft 5 is larger than the shaft 6, the bearings 3 are of larger diameter than the bearings 4, and in order to equalize the areas of the bearing surfaces for the larger and smaller shafts, so that wear or friction will be substantially uniform on both, the bearings 3 are formed shorter in length than the bearings 4.

8 is the tubular body or ring which encloses the yoke arms and transmits the torque from one yoke to the other through the shafts 5, 6, the body being provided with openings for receiving the ends of the shafts. The body is here shown as octagonal and hence has flat sides overlying the outer flattened faces of the bearings 3, 4 of the yokes and these flat sides are formed with openings for receiving the ends of the shafts 5, 6.

Obviously, the shaft 5 is held from displacement by the fact that the smaller shaft 6 extends through the passage 7 therein. The means for holding the shaft 6 from axial displacement and from relative rotary movement relative to the body 8 comprises keys extending through the outer end of the shaft 6 and interlocking with the body 8.

9 designates the keys which extend through transverse passages 10 in the ends of the shaft 6, and in order to hold the keys from displacement, the flat sides of the body 8 overlying the bearings 4 are formed with grooves or seats 11 arranged diametrically opposite each other on opposite sides of the openings 12 in the body 8 for the shaft 6, and these grooves 11 are normally alined at their inner ends with the key holes 10 but have arc shaped bottoms, so that the keys which are normally straight, when driven through the key holes 10 have their end portions 13 on opposite sides of the shaft deflected out of the straight line by the arc shaped bottoms of the grooves, so that the keys are held from displacement.

This universal joint is particularly advantageous in that it is extremely economical to manufacture, readily assembled, highly efficient and durable in use.

What I claim is:

1. A universal joint construction comprising yokes arranged at a right angle to each other, a cross member having its arms journalled in the yoke and a body consisting of a short tube having portions overlying the outer faces of the yoke arms and openings for receiving the ends of the arms of the cross member.

2. A universal joint construction comprising yokes arranged at a right angle to each other, a shaft journalled in the arms of one yoke and having a transverse passage therethrough between its ends, a second shaft journalled in the arms of the other yoke and extending through the passage of the former shaft, a body consisting of a short tube having portions overlying the outer faces of the yoke arms and openings for receiving the ends of the shafts, and means for locking the second shaft to the tubular body.

3. A universal joint construction comprising yokes arranged at a right angle to each other, a shaft journalled in the arm of one yoke and having a transverse passage therethrough between its ends, a second shaft journalled in the arms of the other yoke and extending through the passage of the former shaft, a tubular body having portions overlying the outer faces of the yoke arms and openings for receiving the ends of the shafts, the second shaft being provided with transverse key holes through its outer ends and the tubular body being formed with seats alined with holes and keys extending transversely through the key holes and having their ends lying in the seats.

4. A universal joint construction comprising yokes arranged at a right angle to each other, a shaft journalled in the arm of one yoke and having a transverse passage therethrough between its ends, a second shaft journalled in the arms of the other yoke and extending through the passage of the former shaft, a tubular body having portions overlying the outer faces of the yoke arms and openings for receiving the ends of the shafts, the second shaft being provided with transverse key holes through its outer end and the tubular body being formed with seats alined with holes and keys extending transversely through the key holes and having their ends lying in the seats, said seats being curved from their outer ends out of alinement with the key holes and acting to deflect the ends of the keys out of alinement when the keys are inserted through the key holes.

5. A universal joint construction comprising yokes arranged at a right angle to each other, a shaft journalled in the arms of one yoke and having a transverse passage therethrough between its ends, a smaller shaft journalled in the arms of the other yoke and extending through the passage of the former shaft, a tubular body having flattened portions overlying the outer faces of the yoke arms, said flattened portions being provided with openings for receiving the ends of the shafts and the flattened portions adjacent the ends of the smaller shaft being provided with diametrically opposite grooves having arc shaped bottoms and the smaller shaft having transverse key holes at each end alined with the inner ends of the grooves and a key arranged in the key hole at each end of the smaller shaft and having its ends lying in the alined grooves, the grooves serving to deflect the ends of the key out of a straight line.

In testimony whereof, I have hereunto signed my name at Syracuse, in the county of Onondaga, and State of New York, this 16th day of June 1924.

CHARLES S. BROWN.